July 26, 1960     A. M. SAMPLES     2,946,890
FILM HOLDER FOR MONITORING RADIATION
Filed Sept. 17, 1957     3 Sheets-Sheet 1
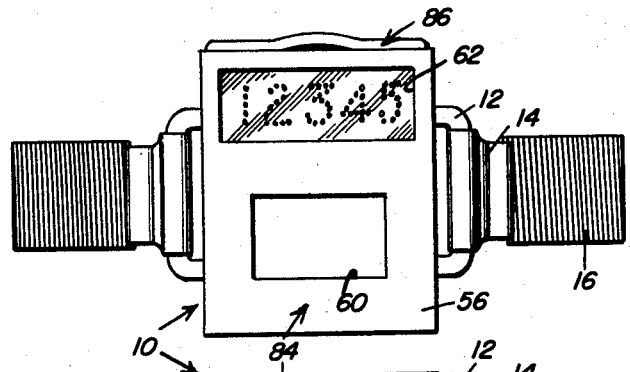
Fig.1
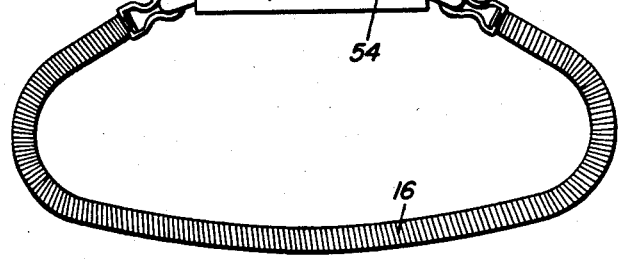
Fig.2
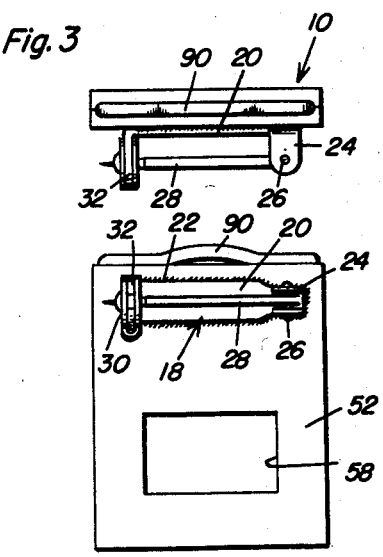
Fig.3
Fig.4
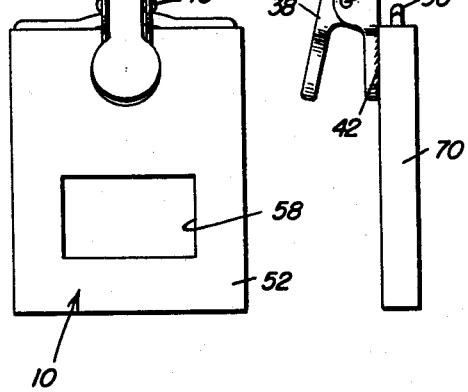
Fig.5
Fig.6
Arthur M. Samples
INVENTOR.
BY
Attorneys July 26, 1960  A. M. SAMPLES  2,946,890
FILM HOLDER FOR MONITORING RADIATION
Filed Sept. 17, 1957  3 Sheets-Sheet 2

Arthur M. Samples
INVENTOR.

BY
Attorneys

July 26, 1960 A. M. SAMPLES 2,946,890
FILM HOLDER FOR MONITORING RADIATION
Filed Sept. 17, 1957 3 Sheets-Sheet 3
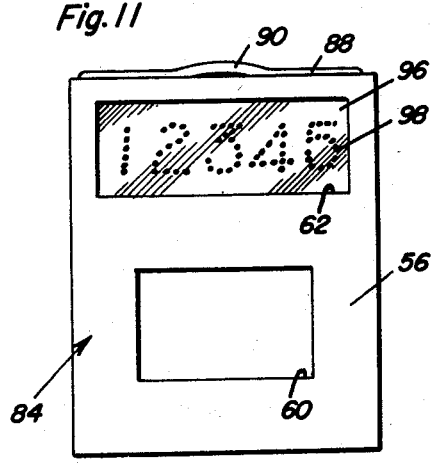
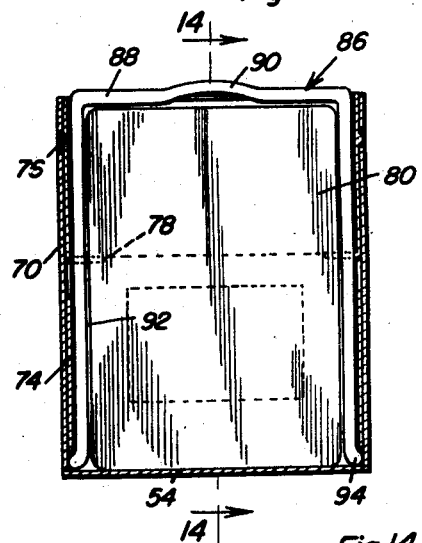
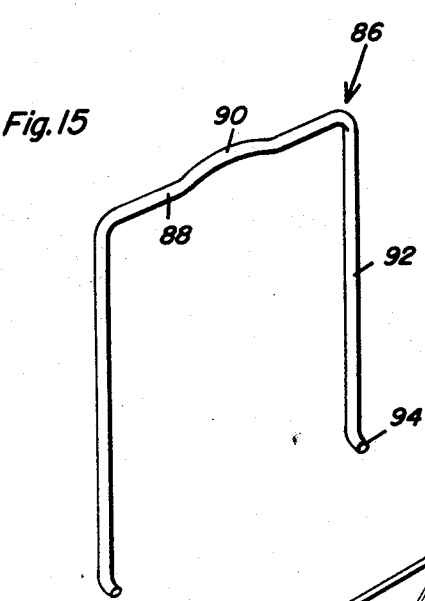
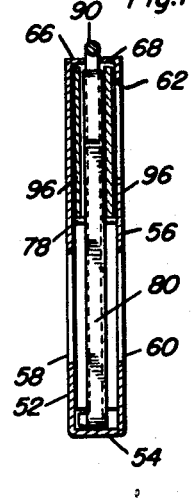
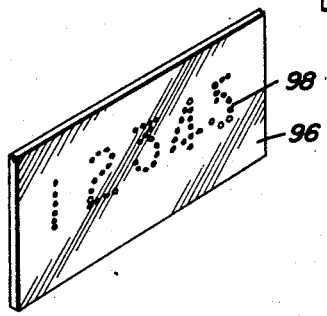
Arthur M. Samples
INVENTOR.
BY
Attorneys United States Patent Office 2,946,890
Patented July 26, 1960

2,946,890

FILM HOLDER FOR MONITORING RADIATION

Arthur M. Samples, 2904 Tazewell Pike, Knoxville, Tenn.

Filed Sept. 17, 1957, Ser. No. 684,453

2 Claims. (Cl. 250—83)

The present invention generally relates to a film holder or film badge for mounting upon a person's clothing or directly onto the person with the film carried in the holder or badge being capable of monitoring radiation that the wearer may encounter thus enabling the wearer to determine to what degree he has been exposed to radiation.

An object of the present invention is to provide a film holder for monitoring radiation having a novel structural arrangement enabling the device to be carried or mounted on various articles of clothing or directly onto the wearer with a portion of the film being shielded for purposes of comparing the shielded area of the film with the unshielded area whereby the film is capable of monitoring beta, gamma radiation and neutrons.

Another object of the present invention is to provide a film holder for purposes of monitoring radiation which is simple in construction, easy to attach, well adapted for its intended purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of the present invention which is adapted for wearing on the wrist;

Figure 2 is a side elevation of the construction of Figure 1;

Figure 3 is a plan view of a form of the present invention using a pin-type fastener;

Figure 4 is a rear elevation of the construction of Figure 3;

Figure 5 is a front elevation of another form of the present invention using an alligator clip support;

Figure 6 is a side elevational view of the construction of Figure 5;

Figure 10 is a top plan view of the film holder;

Figure 11 is a front view of the film holder;

Figure 12 is a side elevational view of the film holder;

Figure 13 is a transverse sectional view taken substantially upon a plane passing along section line 13—13 of Figure 10 illustrating the manner in which the film is held into the film holder;

Figure 14 is a vertical sectional view taken substantially upon a plane passing along section line 14—14 of Figure 13 illustrating the manner in which the film is held within the holder together with the manner in which the shield plates are held in position;

Figure 15 is a perspective view of the wire retainer employed for holding the film in position; and Figure 16 is a perspective view of one of the shields.

Figure 7:
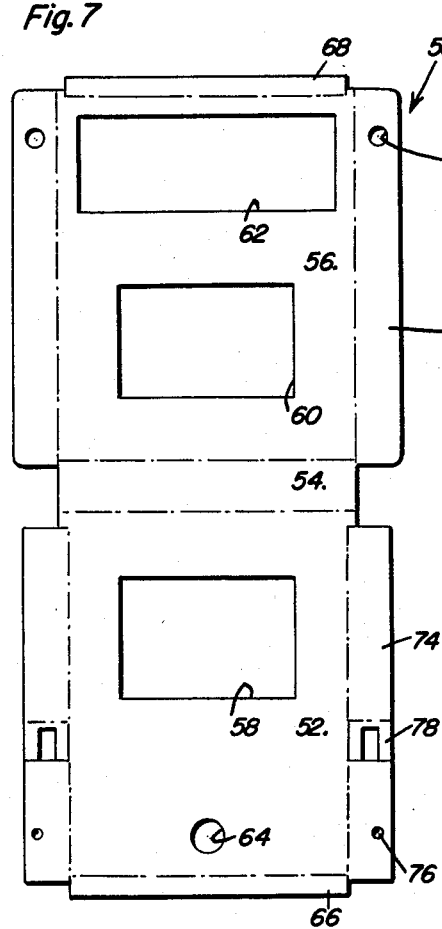
Figure 7 is a plan view of the flat blank from which the film holder is constructed.

Figures 1–6 inclusive illustrate three different types of supporting mechanisms for the film holder of the present invention. The film holder is generally designated by the numeral 10 in each instance.

In Figures 1 and 2, the film holder 10 is provided with a pair of U-shaped brackets 12 attached to the side walls thereof for receiving end clips 14 on the ends of a flattened coil spring watch band 16 which is preferably constructed of resilient corrosive resistant material. The U-shaped brackets 12 may be slanted slightly towards the rear wall of the film holder 10 for facilitating the assembly fo the film holder 10 onto the wrist of a wearer where by the resiliency of the band 16 will maintain the film holder 10 on the wrist substantially in the nature of a wrist watch.

Figures 3 and 4 illustrate a modified form of the invention in which the film holder 10 is provided with a pin type fastener generally designated by the numeral 18 on the rear upper surface thereof with the fastener 18 including the base 20 secured to the film holder 10 by any suitable means such as soldering or the like as designated by numeral 22. The base 20 is provided with a pair of projecting ears 24 having a vertical pin 26 extending therethrough for hingedly receiving a pointed pin 28 having the free end thereof associated with a rotatable catch 30 mounted on a projecting lug plate 32 which is bifurcated for receiving the end of the pin 28 when it is swung inwardly whereby the lock or catch plate 30 is provided with a notch for permitting entry of the free end of the pin 28 so that it may move to a position shown in Figure 3 after which the catch plate 30 may be rotated out of alignment with the slot or notch in the projection 32 thus locking the pin 28 in closed position. This type of pin is found on jewelry items attached to clothing.

Figures 5 and 6 illustrate a form of the inventoin in which the film holder 10 is provided with an alligator clip type fastener generally designated by numeral 34. This type of fastener includes a pair of members 36 and 38 hingedly interconnected adjacent their centers 40 with one end of each of the members forming a handle with one of the handles being secured to the rear of the film holder 10 as by soldering 42 or the like. The other or free end of the members 36 and 38 are provided with serrations on the inner surfaces thereof as designated by the numeral 44 for gripping an article of clothing or a belt or the like. Axial spring means 46 is provided on the pin 40 for urging the jaws 44 into clamping position.

Figure 8:
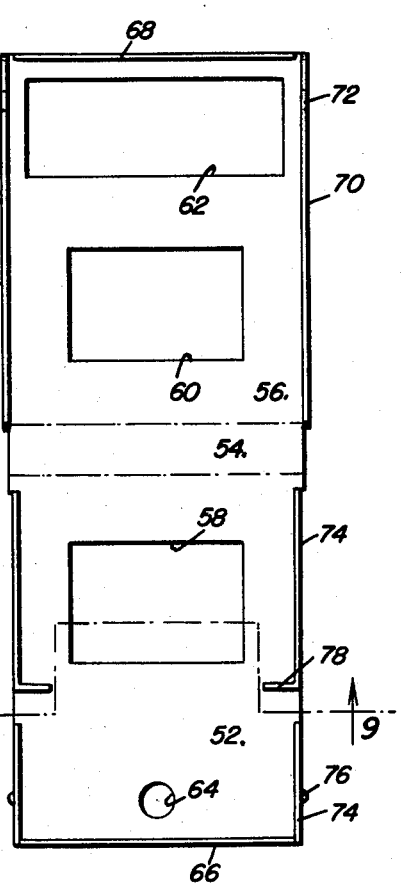
Figure 8 is a plan view fo the blank of Figure 7 showing an initial step in the formation of the film holder.
Figure 9:
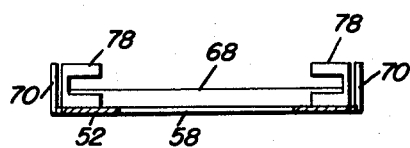
Figure 9 is a transverse, sectional view taken substantially upon a plane passing along section line 9—9 of Figure 8.

Reference is now made to Figure 7–9 of the drawings in which the blank for forming the film holder 10 is shown and generally designated by the numeral 50. The blank 50 may be constructed of sheet metal or equivalent sheet material and is generally rectangular in overall configuration and provided with a rear panel 52 of rectangular configuration, a bottom panel 54 and a front panel 56 with the front and rear panels being equal in size and with the bottom panel 54 being relatively small. The rear panel 52 is provided with an enlarged opening or window 58 adjacent the bottom edge thereof and the front panel 56 is provided with a similar window or opening 60 therein adjacent the bottom edge thereof for alignment with the window 58 when the front and rear panels are disposed in parallel relation. The front panel 56 is provided with an enlarged opening or window 62 adjacent the upper edge thereof while the rear panel 52 is also provided with a small circular opening 64 adjacent the upper edge thereof for rotatably riveting clip 34.

The rear panel 52 is provided with a projecting flap or tab 66 at one end thereof and the front panel 56 is provided with a similar tab 68 on the outer end thereof.

The front panel 56 is provided with a pair of side tabs or flaps 70 thereon with each of the side flaps 70 having an opening 72 formed adjacent the upper edge thereof. Each side edge of the back panel 52 is provided with a side flap 74 having a detent therein as designated by numeral 76 adjacent the upper end thereof and having a bifurcated lug 78 disposed generally centrally thereof and above the window 58. The bifurcated lug 78 is severed from the rear wall panel 52 and also along one edge thereof with the lug 78 being connected to the flap 74 only along one edge. All of the elements of the blank are connected to each other along fold lines with it being noted that the fold lines joining the flap 74 to the panel 52 are disposed inwardly of the fold line joining the flaps 70 to the front panel 56 whereby the flap 74 will be disposed inwardly of the flap 70 when the flaps are folded to a perpendicular relation to the panels 52 and 56 as illustrated in Figure 8 for permitting telescopic association of these flaps.

In forming the film holder, the blank of Figure 7 is folded in such a manner that the tabs 66 and 68 are disposed in perpendicular or vertical position as are the flaps 70 and 74. The lugs 78 are bent inwardly in perpendicular relation to the flaps 74 as clearly illustrated in Figures 8 and 9. This defines a pair of inwardly facing bifurcated lugs for permitting insertion of a film pack designated by numeral 80 in a manner described hereinafter. It is pointed out that the tabs 66 and 68 are each less than one-half the width of the bottom panel 54 whereby a transverse slot 82 will be defined in the top of the film holder 10 for permitting insertion of the film pack 80 into the casing of the film holder which is generally designated by the numeral 84.

For forming a closure for the slot 82, a generally U-shaped wire member 86 is provided which has a bight portion 88 having a slight upwardly bowed central portion 90 forming a hand hold for manipulating the U-shaped wire member 86. The U-shaped wire member 86 is also provided with a pair of depending parallel legs 92 having laterally offset lower ends 94 which project outwardly.

With the casing 84 and the wire member 86 assembled therein, it is then possible to pull the wire member 86 outwardly of the casing a limited distance until the lugs or lower ends 94 stop against bifurcated lugs 78. In this position loading and unloading the film packet is possible without removing the wire member, cadmium shields, or without opening the film badge. The wire member will have a slight radius or curvature so that when pulled out of film holder it will travel downwardly permitting the film to be removed or inserted over its upper side without bending the film packet. The .028" offset on ends of wire member latch into cut away openings on either side of case locking the wire member in closed position. The film pack 80 is of any convenient construction such as a child size dental X-ray film packet equipped with two films capable of monitoring beta, gamma radiation and neutrons. The film pack 80 will rest against the bottom wall 54 and be received between the free ends of the bifurcated bracket 78. A pair of shield plates 96 are then inserted with one being disposed on either side of the film pack 80 and resting against the ledge defined by the bifurcated lugs 78. One of the shield plates 96 may be provided with perforations defining numbers 98 whereby an identification number may be provided for the film pack 80 when it is exposed to radiation since this permits low energy X-rays to penetrate through the holes onto the films. The shield plates 96 are preferably cadmium shields which may conveniently be 1 mm. in thickness. The shield plate 96 having the indicia forming perforations therein is disposed in alignment with the window 62 for purposes of providing identifying indicia on the film pack when it is exposed to radiation. The two large windows 60 and 58 expose the major portion of the remainder of the film area although one of these openings will normally be closed by the wrist in the wrist type of supporting mechanism. In order to hold the film pack 80 and the shield plates 96 in position, the U-shaped wire member 86 is pushed inwardly with the offset lower ends 94 then extending outwardly into underlying relation to the bottom edge of the side flaps 74 which are disposed slightly above the bottom of the rear panel 52 as clearly shown in Figure 14 and also in Figure 7. The wire member 86 maintains the film pack 80 in position and permits the removal and replacement thereof.

For maintaining the casing 84 in assembled position, the detents 76 will be disposed in snap engagement with the apertures 72 thus maintaining the front and rear panels 52 and 56 in substantially parallel relation and preventing disassembly or accidental spreading open of the casing 84.

The entire device may be constructed of stainless steel, non-magnetic, corrosive resistant material having a long life and which is inexpensive and light in weight. The device also permits easy insertion and removal of the film together with the positive means of locking the film in the holder. The letters or indicia 98 may be cut all of the way through the plates 96 or may be cut through to provide a very thin shield plate for purposes of identifying the film pack 80 when it is removed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A holder for radiation monitoring film comprising a generally rectangular hollow one-piece casing having a pair of openings in one face thereof for permitting passage of radiation, one end edge of said casing having a slot-like opening for receiving radiation sensitive film for positioning behind the openings, each side edge of said casing having an inwardly extending lug between the pair of openings, the free ends of said lugs receiving the film therebetween, a pair of radiation shields resting on said lugs and extending to the slotted end edge of the casing with a portion of the film received between the shields, said shields having openings defining indicia with the openings in alignment with one of said openings in the face of the casing whereby radiation passing through the openings in the shield will form the indicia on the film, a U-shaped wire member movably mounted in said casing with the bight portion forming a closure for the slot in the end edge of the casing, the legs of said wire member extending into the casing alongside the side edges of the film, the end of the casing remote from the slot having a pair of horizontal ledges with the free ends of the leg members projecting laterally for releasable engagement under the ledges thereby releasably holding the wire member in the casing with the bight portion closing the slot in the end edge thereof.

2. A holder for radiation monitoring film comprising a generally rectangular hollow casing having an opening in one face thereof for permitting passage of radiation, one end edge of said casing having a slot-like opening for receiving radiation sensitive film for positioning in alignment with the opening in the face of the casing, means disposed within said casing and projecting from each side edge thereof for engaging film and retaining the film in position with the opening in the face of the casing, a pair of radiation shields resting on said means and extending to the slotted end edge of the casing with a portion of the film received between the shields, said shields having indicia defining apertures therein in alignment with the openings in the face of the casing and in alignment with the film whereby radiation passing through the apertures in the shield will form the indicia on the film for purposes of identifying the film, and removable means forming a closure for the slot-like opening in the end of the casing and partially enclosing the shields and the film, said means including a generally U-shaped member having a bight portion forming a closure for the slot-like opening and leg portions extending alongside of the side edges of the film, the free ends of the legs each having a lateral projection for engagement with the casing for releasably retaining the U-shaped member within the casing with the bight portion of the U-shaped member received in the slot-like opening thereby forming a closure for the slot-like opening and retaining the film and shields within the casing.

References Cited in the file of this patent

UNITED STATES PATENTS

| | | |
|---|---|---|
| 2,483,991 | Wollen et al. | Oct. 4, 1949 |
| 2,496,218 | Kieffer | Jan. 31, 1950 |
| 2,659,013 | Davis et al. | Nov. 10, 1953 |
| 2,706,939 | Fairbank | Apr. 26, 1955 |
| 2,753,460 | Reed | July 3, 1956 |
| 2,855,519 | Kocher | Oct. 7, 1958 |